( 12 ) United States Patent
Jain

(10) Patent No.: US 10,484,357 B1
(45) Date of Patent: *Nov. 19, 2019

(54) METHOD AND APPARATUS FOR FEDERATED SINGLE SIGN ON USING AUTHENTICATION BROKER

(71) Applicant: EMC Corporation, Hopkinton, MA (US)

(72) Inventor: Manoj K. Jain, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,564

(22) Filed: Mar. 11, 2016

Related U.S. Application Data

(63) Continuation of application No. 13/731,547, filed on Dec. 31, 2012, now Pat. No. 9,286,465.

(51) Int. Cl.
*H04L 29/06* (2006.01)

(52) U.S. Cl.
CPC .......... *H04L 63/0815* (2013.01); *H04L 63/10* (2013.01)

(58) Field of Classification Search
CPC ............................ H04L 63/0815; H04L 63/10
See application file for complete search history.

(56) References Cited

U.S. PATENT DOCUMENTS

| | | | | |
|---|---|---|---|---|
| 6,339,423 B1* | 1/2002 | Sampson | ........... | G05B 19/0425 709/219 |
| 10,069,838 B2* | 9/2018 | Sanso | ................... | H04L 63/104 |
| 2004/0128392 A1* | 7/2004 | Blakley, III | ........ | H04L 63/0815 709/229 |
| 2004/0128393 A1* | 7/2004 | Blakley, III | ........ | H04L 63/0807 709/229 |
| 2005/0204148 A1* | 9/2005 | Mayo | ................... | H04L 63/0815 713/185 |
| 2005/0267979 A1* | 12/2005 | Bailey | .................. | H04Q 3/0025 709/230 |
| 2006/0021019 A1* | 1/2006 | Hinton | ..................... | G06F 21/41 726/10 |
| 2006/0080352 A1* | 4/2006 | Boubez | .................... | H04L 63/08 |
| 2006/0218628 A1* | 9/2006 | Hinton | ................ | H04L 63/0815 726/8 |
| 2007/0107048 A1* | 5/2007 | Halls | ....................... | G06F 21/33 726/4 |
| 2007/0234417 A1* | 10/2007 | Blakley, III | ........ | H04L 63/0281 726/12 |
| 2009/0119763 A1* | 5/2009 | Park | .................... | H04L 63/0815 726/8 |

(Continued)

*Primary Examiner* — J. Brant Murphy
(74) *Attorney, Agent, or Firm* — Krishnendu Gupta; Jason Reyes; Anne-Marie Dinius

(57) ABSTRACT

Example embodiments of the present invention provide a method, an apparatus, and a computer program product for brokering establishment of a trusted relationship between a first domain and a second domain. The method includes receiving, from a first domain, a request to establish a trusted relationship with a second domain and brokering establishment of the trusted relationship between the first domain and the second. Other example embodiments include brokering authenticated access for a client in the first domain to a resource in the second domain according to the established trusted relationship.

19 Claims, 4 Drawing Sheets

(56) References Cited

U.S. PATENT DOCUMENTS

| | | | | |
|---|---|---|---|---|
| 2009/0293108 A1* | 11/2009 | Weeden | ............... | G06F 21/41 |
| | | | | 726/6 |
| 2009/0320103 A1* | 12/2009 | Veeraraghavan | ..... | G06F 21/335 |
| | | | | 726/4 |
| 2011/0145565 A1* | 6/2011 | Kol | ............... | H04L 12/58 |
| | | | | 713/155 |
| 2011/0209202 A1* | 8/2011 | Otranen | ............... | H04L 63/08 |
| | | | | 726/4 |
| 2014/0150078 A1* | 5/2014 | Wu | ............... | H04L 63/0815 |
| | | | | 726/8 |
| 2014/0173753 A1* | 6/2014 | Sanso | ............... | H04L 63/104 |
| | | | | 726/28 |
| 2014/0223537 A1* | 8/2014 | Islam | ............... | H04L 63/0876 |
| | | | | 726/12 |

* cited by examiner

METHOD AND APPARATUS FOR FEDERATED SINGLE SIGN ON USING AUTHENTICATION BROKER

CROSS REFERENCE TO RELATED APPLICATION

This Application in a Continuation of U.S. patent application Ser. No. 14/144,644 entitled "METHOD AND APPARATUS FOR CREATING A SHORT HASH HANDLE HIGHLY CORRELATED WITH A GLOBALLY-UNIQUE HASH SIGNATURE" filed on Dec. 31, 2013, the teachings of which application are hereby incorporated herein by reference in their entirety.

This Application is related to U.S. patent application Ser. No. 13/631,055 entitled "METHOD AND APPARATUS FOR FEDERATED IDENTITY AND AUTHENTICATION SERVICES" filed on Sep. 28, 2012, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to authenticated access to data services.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligence and communications electronics and software for making the data on the disks available. To leverage the value of MSS, these are typically networked in some fashion.

Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SANs are particularly noted for providing the advantage of being reliable, maintainable, and being a scalable infrastructure, but their complexity and disparate nature make them difficult to centrally manage. Thus, a problem encountered in the implementation of SANs is that the dispersion of resources tends to create an unwieldy and complicated data storage environment. Reducing the complexity by allowing unified management of the environment instead of treating it as a disparate entity would be advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY

Example embodiments of the present invention provide a method, an apparatus, and a computer program product for brokering establishment of a trusted relationship between a first domain and a second domain. The method includes receiving, from a first domain, a request to establish a trusted relationship with a second domain and brokering establishment of the trusted relationship between the first domain and the second domain.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
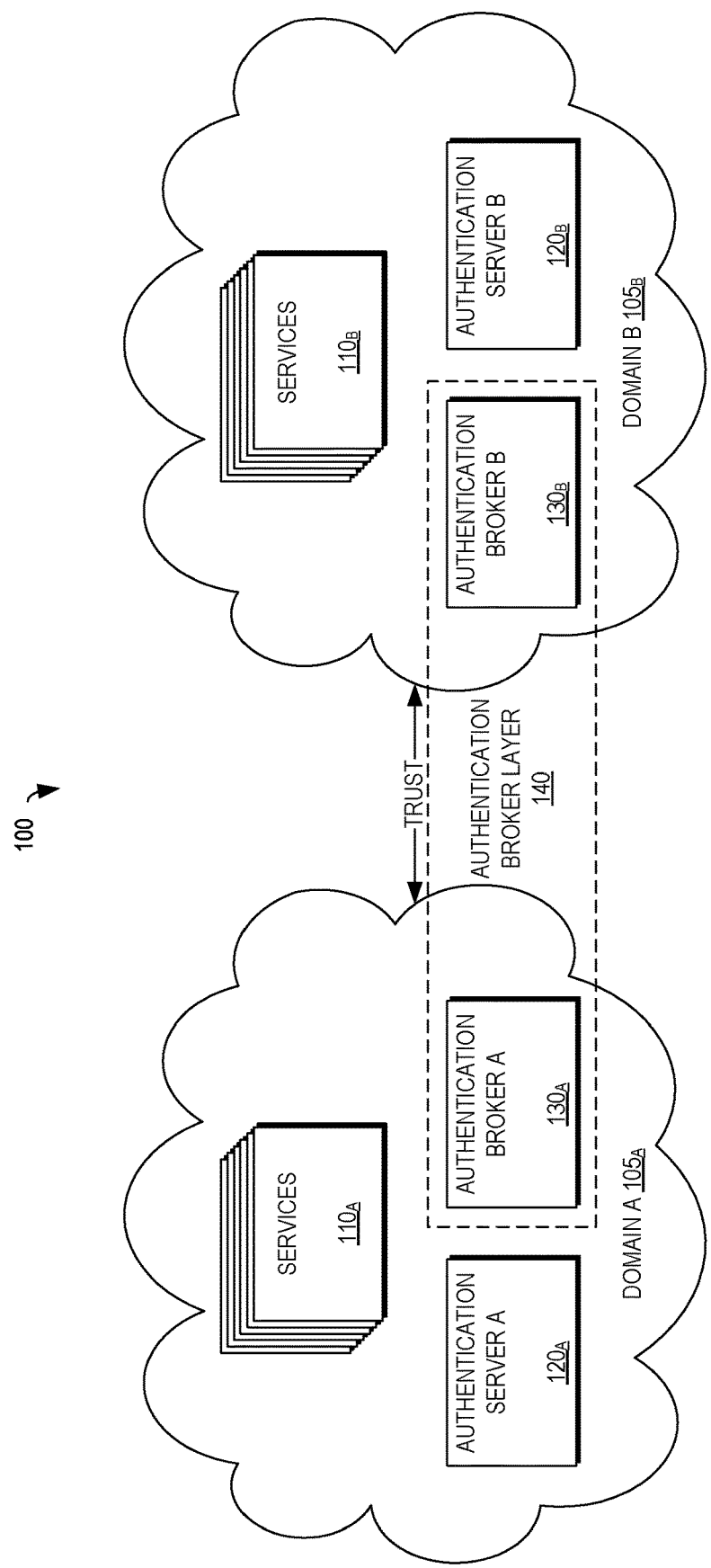
FIG. 1 is a block diagram illustrating a federated SSO deployment according to an example embodiment of the present invention, including an authentication broker layer spanning two respective domains, the authentication broker layer provided by an authentication broker in each domain in conjunction with an authentication server in each domain, each domain providing one or more services.

Traditional public cloud services, such as public clouds like Amazon® Web Services, Microsoft® Windows® Azure™, EMC® Atmos®, have a particular approach to managing users in which all users are inside the system and are provided the right level of access to resources within that public cloud. In order to implement a hybrid cloud, seamless integration with enterprise is needed to provide security and access rights (e.g., active directory groups, single sign on) so that whatever login the user uses within the enterprise works with the cloud. However, service providers cannot access directory servers in an enterprise domain. Although a client in the enterprise domain could provide its password to the service provider, the service provider does not have visibility into the enterprise domain to validate the password (and it is unfavorable for service providers to store such password because of security risks).

Further, an independent identity provider could be used to validate user credentials and return a token to the client to log in to the service. However, validation of a token requires the independent identity provider to cross the enterprise firewall. If the independent identity provider exists in the service provider domain, it cannot validate user credentials with the enterprise directory because it cannot cross the enterprise firewall to reach the enterprise directory; if the independent identity provider exists in the enterprise domain, the service provider cannot validate the token received by the service provider from the client because the service provider cannot cross the enterprise firewall to reach the independent identity provider.

For enterprises adopting cloud based services, federated single sign on (SSO) is advantageous for secure information sharing across private, public, and hybrid cloud deployments. Federated SSO establishes trust among independent authentication domains to access protected services by those domains. As such there are several open standards, such as Security Assertion Markup Language (SAML), OAuth and OpenID. However, these standards do not interoperate with each other. Accordingly, there exists a need to integrate different authentication technology to provide a federated SSO solution.

Example embodiments of the present invention provide a broker-based solution providing federated SSO to access services protected by respective authentication domains that establishes trust between the domains. In certain embodiments, different authentication domains establish trust among them depending on organization federation policy. As will be described in greater detail below, a client may redirect a request to an authentication broker to authenticate with a foreign security domain and retrieve a security token for access to a service protected by the foreign security domain. The authentication broker may retrieve the authentication token on behalf of the requesting client. The client then may use the security token to access the service from the foreign domain which may return the response in the session of the requesting domain so the SSO session is maintained.

Establishing trust between the domains enables federated SSO across authentication domains that is decoupled from access, thereby allowing adaptation to policies and protocols of foreign authentication domains. Further, in certain embodiments, an authentication broker in a client domain proxies a client request, thereby eliminating the need for directory services for authentication and authorization with foreign domains. Moreover, adoption of new protocols and policies for federation may be gained at the authentication broker layer rather than at the client layer.

FIG. 1 is a block diagram illustrating a federated SSO deployment according to an example embodiment of the present invention. As illustrated in FIG. 1, an authentication broker layer 140 spans two respective domains (105 generally) (e.g., Domain A $105_A$ and Domain B 105). As will be described in greater detail below, the authentication broker layer 140 enables the domains 105 to establish trust amongst themselves.

In a preferred embodiment, the authentication broker layer 140 may be provided by an authentication broker (130 generally) in each domain 105 (e.g., Authentication Broker A $130_A$ in Domain A $105_A$ and Authentication Broker B $130_B$ in Domain B $105_B$) in conjunction with an authentication server (120 generally) in each domain 105 (e.g., Authentication Server A $120_A$ in Domain A $105_A$ and Authentication Server B $120_B$ in Domain B $105_B$), each domain 105 providing one or more services (110 generally) (e.g., Service $110_A$ in Domain A $105_A$ and Services $110_B$ in Domain B $105_B$).

As illustrated in FIG. 1, each authentication domain 105 protects respective services 110. However, in order to access services in one domain (e.g., Domain B $105_B$), a client (not shown) in another domain (e.g., Domain A $105_A$) may require authentication. As will be described in greater detail below, the client may receive a service token issued by the other domain. Domain A $105_A$ may include a plurality of users (not shown) that have roles as determined by, for example, an enterprise. Identities for these users, as well as their assigned roles, may be included in an identity provider in Domain A $105_A$, such as a directory (not shown). The directory may be an Active Directory or any other identity provider, such as those conforming to Lightweight Directory Access Protocol (LDAP), X.509 certificates, or SPNEGO.

Figure 2:
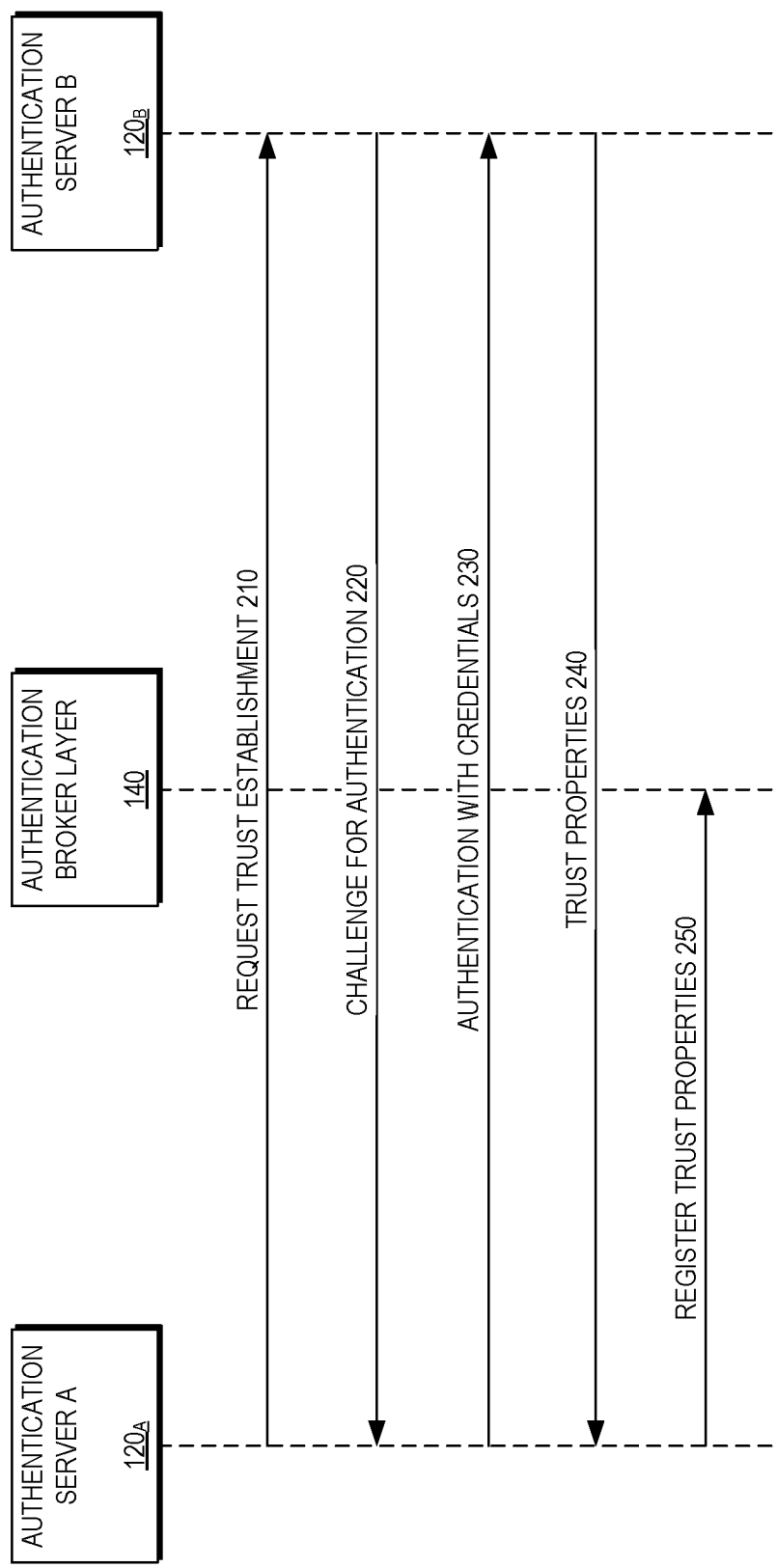
FIG. 2 is a sequence diagram illustrating a sequence of interactions between authentication servers in respective domains via an authentication broker layer for establishment of trust among federated authentication domains.

FIG. 2 is a sequence diagram illustrating a sequence of interactions between authentication servers 120 in respective domains 105 via an authentication broker layer for establishment of trust among federated authentication domains 105. As illustrated in FIG. 2, Authentication Server A $120_A$ in Domain A $105_A$ may request trust establishment, via the authentication broker layer 140, with Authentication Server B $120_B$ in Domain B $105_B$ (210). In response to the request, Authentication Server B $120_B$ may provide a challenge for authentication to Authentication Server A $120_A$ (220). Authentication Server A $120_A$ then may respond to the challenge by authenticating with credentials with Authentication Server B $120_B$ (230). If Authentication Server A $120_A$ authenticates successfully with Authentication Server B $120_B$, Authentication Server B $120_B$ may provide trust properties to Authentication Server A $120_A$ (240). Authentication Server A $120_A$ then may register these trust properties with the authentication broker layer 140 (i.e., Authentication Broker A $130_A$) (250).

As discussed above, a successful trust establishment between Authentication Server 120 may cause a set of trust properties to be registered in an Authentication Broker 130. In a particular embodiment, the format of the trust properties is includes a uniform resource locator (URL) for the authentication domain (e.g., Domain B $105_B$), an authentication protocol identifier, a role, and attributes. Roles may be assigned by the domain from which access to resources is being requested (i.e., Domain B $105_B$) and, in some embodiments, may be based on a level of trust determined by that domains (i.e., Domain B $105_B$). For example, roles may includes Partner, Restricted User, Guest, Administrator, etc. Attributes may provide fine-grained access control to domain (e.g., Domain B $105_B$) resources and may be used by the local domain (i.e., Domain A $105_A$) to request access to domain (e.g., Domain B $105_B$) resources. In some embodiments, access also may be controlled based on local domain (i.e., Domain A $105_A$) policies.

Figure 3:
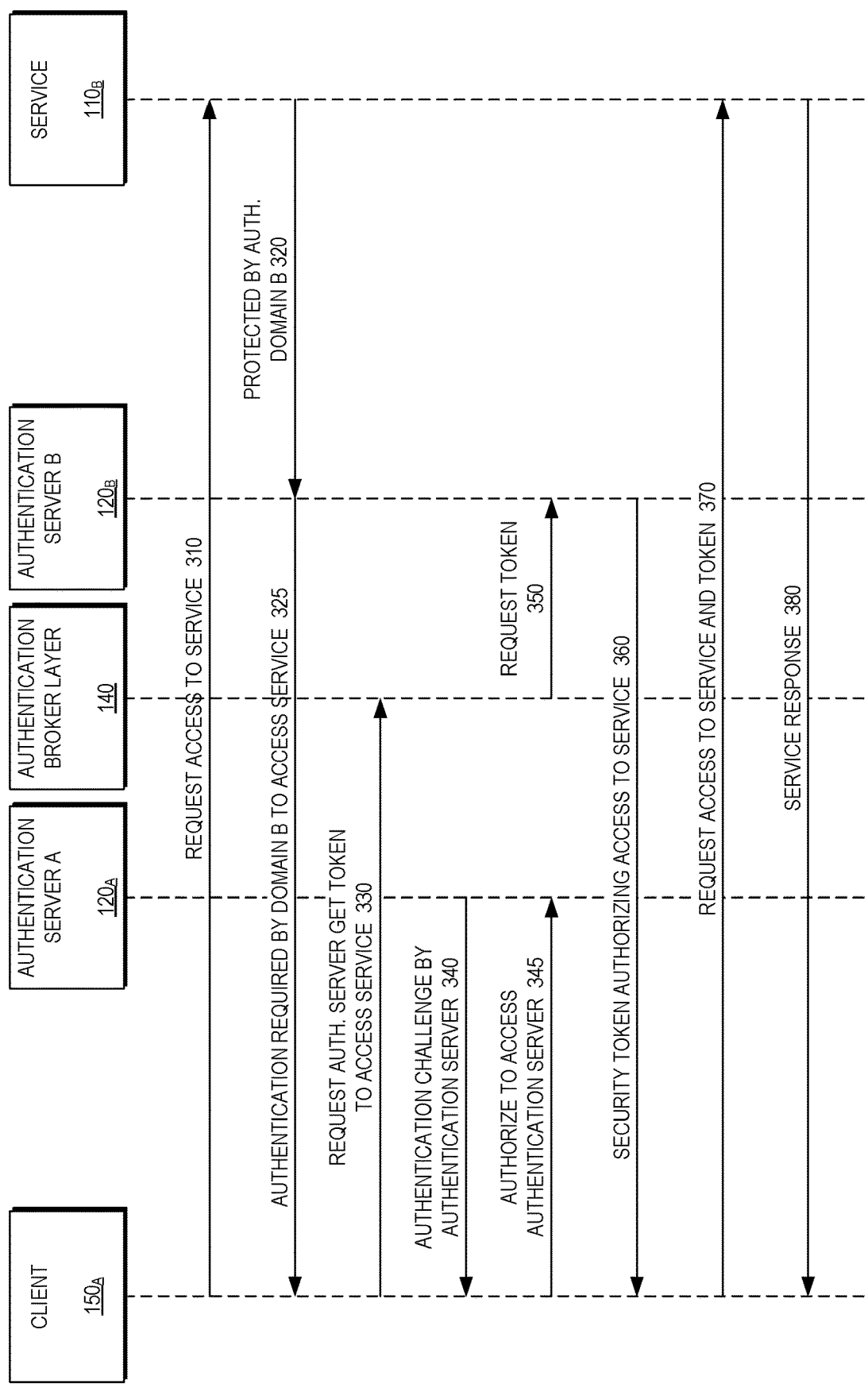
FIG. 3 is a sequence diagram illustrating a sequence of interactions between a client in a first domain and a service in a second domain as brokered by an authentication broker layer spanning the first and second domains in conjunction with respective authentication servers in each domain to access services protected by the second domain through the authentication broker layer.

FIG. 3 is a sequence diagram illustrating a sequence of interactions between a client $150_A$ in a first domain $105_A$ and a service $110_B$ in a second domain $105_B$ as brokered by an authentication broker layer 140 (including Authentication Brokers 130 as illustrated in FIG. 1) spanning the first and second domains 105 in conjunction with respective authentication servers 120 in each domain 105 (e.g., Authentication Server A $120_A$ in Domain A $105_A$ and Authentication Server B $120_B$ in Domain B $105_B$) to access services $110_B$ protected by the second domain $105_B$ through the authentication broker layer 140.

As illustrated in FIG. 3, a client $150_A$ may request access to a service $110_B$ protected by Domain B $105_B$ (310). In response to the request for access to the service $110_B$, the service $110_B$ may throw an authentication challenge indicating that the service $110_B$ is protected by Domain B $105_B$. In some embodiments, the authentication challenge may be provided to the client $150_A$ directly from the service $110_B$ (320). In other embodiments, the authentication challenge may be provided to the client $150_A$ directly by Authentication Server B $120_B$ providing protection to the service $110_B$. In yet another embodiment, the service $110_B$ may request (320) that Authentication Server B $120_B$ notify (325) the client $150_A$.

In turn, the client $150_A$ may, via Authentication Server A $120_A$, request that the Authentication Broker Layer 140 (i.e., Authentication Broker A $130_A$) retrieve a security token to access the service $110_B$ (330). In certain embodiments, Authentication Server A $120_A$ may, within its local authentication domain, provide an authentication challenge to the client $150_A$ (340) to which the client $150_A$ may provide a response to authorize access to Authentication Server A $120_A$ (345).

If the local authentication is successful, or if there is no local authentication required by Authentication Server A $120_A$, the Authentication Broker Layer 140 (i.e., Authentication Broker A $130_A$) may request a security token from Authentication Server B $120_B$ (350). In certain embodiments, prior to requesting the security token, the Authentication Broker Layer 140 (i.e., Authentication Broker A $130_A$) may retrieve the roles of the client $150_A$ (i.e., the logged-in user). The Authentication Broker Layer 140 (i.e., Authentication Broker A $130_A$) then may search a registry for registered authentication domains (e.g., 250 of FIG. 2) and extract the properties required to request the security token from foreign domain. As should be understood, in order to comply with the formats and protocols of the security domain, the Authentication Broker Layer 140 (i.e., Authentication Broker A $130_A$) may encapsulate the client request in the format accepted by foreign domain (e.g., Domain B $105_B$) and proxy it request the foreign domain issue security token.

The Authentication Server B $120_B$ then may authenticate the request and provide a security token to the client $150_A$ authorizing access for the client $150_A$ to the service $110_B$. In certain embodiments, Authentication Server B $120_B$ may provide the security token to the client 150A directly or via Authentication Server A $120_A$.

The client $150_A$ in Domain A $105_A$ then may use the security token to request access to the service $110_B$ in Domain B $105_B$ (370). In response, the service $110_B$ may provide a service response to the client $150_A$ (380). The client's $150_A$ use of the token may be an indication of the token, such as the token 255, itself, a request including the token, or an encrypted request signed using the token (i.e., cryptographic request). The indication of the token may be a cryptographically encoded request signed using the token. Authentication Broker B $130_B$ then may decrypt the encoded request signed using the token via a shared key. Authentication Server B $120_B$ then may provide access to the service $110_B$ according to the indication of the token. Similarly, the indication of the token may be a request that includes the token. Authentication Broker B $130_B$ then may extract the token and validate the token via a validation request to Authentication Server B $120_B$ then that generated the token and a validation response from Authentication Server B $120_B$. The Authentication Server B $120_B$ then may provide access to the service $110_B$ according to the indication of the token.

Figure 4:
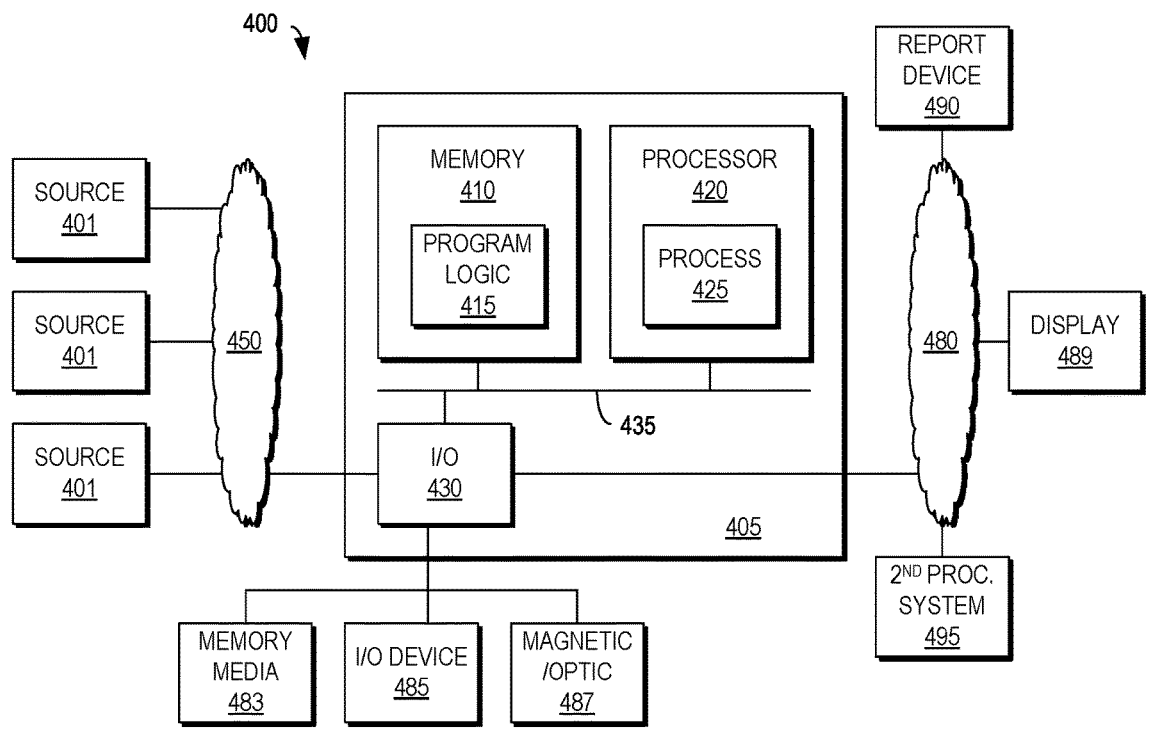
FIG. 4 is a block diagram illustrating an apparatus according to an example embodiment of the present invention.

FIG. 4 is a block diagram of an example embodiment apparatus 405 according to the present invention. The apparatus 405 may be part of a system 400 and includes memory 410 storing program logic 415, a processor 420 for executing a process 425, and a communications I/O interface 430, connected via a bus 435.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 5:
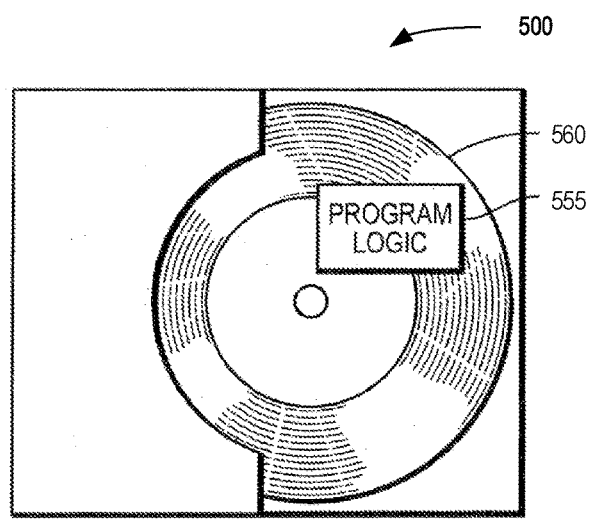
FIG. 5 is an illustration of an apparatus as embodied in program code according to an example embodiment of the present invention.

FIG. 5 shows program logic 555 embodied on a computer-readable medium 560 as shown, and wherein the logic 555 is encoded in computer-executable code configured for carrying out the gas controlling process of this invention, thereby forming a computer program product 500.

The logic for carrying out the method may be embodied as part of the aforementioned system, which is useful for carrying out a method described with reference to embodiments shown in, for example, FIGS. 1-3. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-implemented method for execution in a system comprising a plurality of domains, a plurality of authentication servers, and an authentication broker layer spanning the plurality of domains, the method comprising:

receiving, from a first domain, a request to establish a trusted relationship through a firewall with a second domain, wherein the first domain and the second domain use dissimilar open authentication standards that do not interoperate with each other;

brokering establishment of the trusted relationship, via the authentication broker layer, between the first domain and the second domain, wherein the brokering establishment includes encapsulating the request in a format according, at least in part, to the open authentication standard of the second domain, wherein the request is encrypted; and brokering authenticated access for a client in the first domain to a resource in the second domain according to the established trusted relationship.

2. The method of claim 1 wherein brokering establishment of the trusted relationship between the first domain and the second domain comprises:

forwarding the request to establish the trusted relationship to the second domain;

receiving, from the second domain, a challenge for authentication; and providing the challenge for authentication to the first domain.

3. The method of claim 2 further comprising:

receiving, from the first domain, an authentication request including credentials;

forwarding the authentication request to the second domain;

receiving trust properties from the second domain; and forwarding the trust properties to the first domain.

4. The method of claim 3 further comprising receiving a registration from the first domain to register the trust properties.

5. The method of claim 1 wherein brokering authenticated access for a client in the first domain access to a resource in the second domain according to the established trusted relationship comprises:

receiving, from the first domain, an assertion regarding the resource in the second domain;

generating, according to the assertion, a token, configured to be redeemed by the client in the first domain to access the resource in the second domain; and providing the token to the first domain.

6. The method of claim 5 wherein receiving, from the first domain, an assertion regarding the resource in the second domain comprises:

providing a notification to the first domain that access to the resource by the client in the first domain requires authentication; and receiving a request from the client in the first domain to generate a token for authentication of the client in the first domain to access the resource in the second domain.

7. The method of claim 6 wherein receiving, from the first domain, a request to generate a token for authentication to the resource in the second domain further comprises:

providing an authentication challenge to the client in the first domain; and receiving authorization from the client in the first domain to access the service in the second domain.

8. The method of claim 6 further comprising:

receiving an indication of the token from the client in the first domain; and providing access to the resource in the second domain according to the indication of the token.

9. The method of claim 6 wherein the token is generated in the second domain.

10. A system comprising:

an authentication server configured to receive, from a first domain, a request to establish a trusted relationship through a firewall with a second domain, wherein the first domain and the second domain use dissimilar open authentication standards that do not interoperate with each other; and an authentication broker configured to broker establishment of the trusted relationship between the first domain and the second domain and to broker authenticated access for a client in the first domain to a resource in the second domain according to the established trusted relationship, wherein the brokering establishment includes encapsulating the request in a format according, at least in part, to the open authentication standard of the second domain, and wherein the request is encrypted.

11. The system of claim 10 wherein the authentication broker is further configured to forward the request, to establish the trusted relationship to the second domain, receive, from the second domain, a challenge for authentication, and provide the challenge for authentication to the first domain.

12. The system of claim 10 wherein the authentication service is further configured to receive, from the first domain, an authentication request including credentials, forward the authentication request to the second domain, receive trust properties from the second domain, and forward the trust properties to the first domain.

13. The system of claim 10 wherein the authentication broker is further configured to receive a registration from the first domain to register the trust properties.

14. The system of claim 10 wherein the authentication broker is further configured to receive, from the first domain, an assertion regarding the resource in the second domain; and wherein the authentication server is further configured to generate, according to the assertion, a token configured to be redeemed by the client in the first domain to access the resource in the second domain, and provide the token to the first domain.

15. The system of claim 14 wherein the first domain is configured to provide an authentication challenge to the client in the first domain and receive authorization from the client in the first domain to access the service in the second domain.

16. The system of claim 15 wherein the second domain is configured to receive an indication of the token from the client in the first domain and provide access to the resource in the second domain according to the indication of the token.

17. The system of claim 14 wherein the token is generated in the second domain.

18. The system of claim 10 wherein the second domain is configured to provide a notification to the first domain that access to the service by the client in the first domain requires authentication and receive a request from the client in the first domain to generate a token for authentication of the client in the first domain to access the resource in the second domain.

19. A computer program product including a non-transitory computer-readable storage medium encoded with computer program code that, when executed on a processor of a computer, causes the computer to broker establishment of a trusted relationship between a first domain and a second domain, the computer program product comprising:

computer program code for receiving, from the first domain, a request to establish the trusted relationship through a firewall with the second domain, wherein the first domain and the second domain use dissimilar open authentication standards that do not interoperate with each other; and computer program code for brokering establishment of the trusted relationship, via an authentication broker between the first domain and the second domain and for brokering authenticated access for a client in the first domain to a resource in the second domain according to the established trusted relationship, wherein the brokering establishment includes encapsulating the request in a format according, at least in part, to the open authentication standard of the second domain, and wherein the request is encrypted.

* * * * *